United States Patent [19]
Abthoff et al.

[11] Patent Number: 4,836,161
[45] Date of Patent: Jun. 6, 1989

[54] DIRECT FUEL INJECTION METHOD FOR A DIESEL ENGINE

[75] Inventors: Jörg Abthoff, Plüderhausen; Manfred Fortnagel, Korb; Ludwig Fricker, Stuttgart; Immanuel Kutschera, Neuhausen; Michael Krämer, Notzingen; Michael Kühn, Filderstadt, all of Fed. Rep. of Germany

[73] Assignee: Daimler-Benz Aktiengesellschaft, Stuttgart, Fed. Rep. of Germany

[21] Appl. No.: 105,582

[22] Filed: Oct. 8, 1987

[30] Foreign Application Priority Data

Oct. 8, 1986 [DE] Fed. Rep. of Germany ....... 3634295

[51] Int. Cl.[4] .............................................. F02B 3/12
[52] U.S. Cl. ................................................. 123/299
[58] Field of Search ................................. 123/299, 300

[56] References Cited

U.S. PATENT DOCUMENTS

| | | |
|---|---|---|
| 2,356,627 | 8/1944 | Skakedoff . |
| 4,543,930 | 10/1985 | Baker ................................. 123/299 |
| 4,704,999 | 11/1987 | Hashikawa et al. ................. 123/299 |

FOREIGN PATENT DOCUMENTS

| | | |
|---|---|---|
| 0178427 | 4/1986 | European Pat. Off. . |
| 0178428 | 4/1986 | European Pat. Off. . |
| 902334 | 1/1954 | Fed. Rep. of Germany . |
| 3300876 | 7/1984 | Fed. Rep. of Germany . |
| 3430143 | 3/1985 | Fed. Rep. of Germany . |
| 3540274 | 5/1986 | Fed. Rep. of Germany . |
| 1245520 | 10/1960 | France . |

OTHER PUBLICATIONS

SAE Paper 929A, "Effects of Multiple Introduction of Fuel on Performance of a Compression Ignition Engine", Oct., 1964, by C. P. Gupta et al.
SAE Paper 929B, "The Effect of the Vigom Process on the Combustion in Diesel Engines", Oct., 1964, by P. Eyzat et al.
"What Can Be Gained by Pilot Injection?", Automotive Industries, pp. 533-534, Oct. 29, 1938 by P. H. Schweitzer.
"Pilot Injection Versus Cetane Numbers", Automotive Industries, pp. 60-62, Feb. 15, 1956, by G. Lozano and C. Vogt.

Primary Examiner—Andrew M. Dolinar
Attorney, Agent, or Firm—Barnes & Thornburg

[57] ABSTRACT

The invention relates to a direct fuel injection method for a diesel engine in which a preset quantity of fuel is introduced into a combustion space via a fuel injection nozzle in a preinjection and in a main injection which is separate from the preinjection. To achieve a short ignition delay with lowest possible specific fuel consumption during this process, the beginning of the preinjection occurs within the range of 10°-16° or of 20°-30° crank angle before top dead center, depending on speed, and the beginning of the main injection occurs within the range of 2° after top dead center to 15° before top dead center, the interval between the end of the preinjection and the beginning of the main injection being within the range of 3° to 14° or of 3° to 26° crank angle before top dead center and the preinjection quantity is 10% to 20% or 1% to 5% of the quantity of fuel preset in each case, depending on load.

8 Claims, 2 Drawing Sheets

DIRECT FUEL INJECTION METHOD FOR A DIESEL ENGINE

BACKGROUND AND SUMMARY OF THE INVENTION

The invention relates to a direct fuel injection method of the type using a pre and a main fuel injection for a diesel engine.

U.S. Patent specification 2,356,627 describes such a method in which a preset quantity of fuel is introduced, subdivided into a pre and a main injection, into the combustion space of the internal combustion engine. In detail, the beginning of the preinjection occurs in this process approximately 14° before top dead center of ignition and lasts approximately until 10° before top dead center. After a pause of approximately 9°–10° crank angle, the main injection finally begins approximately before top dead center. On the ratio between pre and main injection quantity, the above document only carries the information that the preinjection quantity can be both smaller than, equal to or also greater than the main injection quantity. In the method according to U. S. Patent specification 2,356,627, it is also provided to select the preinjection quantity and the interval between the end of preinjection and the beginning of the main injection in such a manner that the main injection jet still finds in the combustion space an open flame from the preinjection quantity which is just being converted. Although this type of fuel injection reduces the pressure gradient during the combustion of the main injection quantity, and thus also the combustion noise, cracking of individual fuel molecules introduced with the main injection quantity can very easily occur as a result of the open flame in the combustion space.

This results in increased particulate emission so that a strictly predetermined blackening number is already reached at a relatively low effective mean pressure which lastly encumbers the performance of the internal combustion engine.

Retaining the above referenced angles for pre and main injection, these said disadvantages increasingly occur in higher speed ranges because the time available for forming the mixture decreases with increasing speed so that the combustion, particularly of the main injection quantity, is displaced extremely far into the expansion cycle which leads to considerable losses in efficiency and thus to increased specific fuel consumption.

The invention is therefore based on the objects of creating a fuel injection method by means of which a short ignition delay and an increase in mixture forming energy can be achieved while mantaining the lowest possible specific fuel consumption.

According to the invention, these objects are achieved in accordance with a first preferred embodiment of the invention wherein direct fuel injection is carried out in the following manner:

At engine idling speeds, preinjection is initiated within the range of 10°–16° crank angle before piston top dead center position, main injection is initiated after 2° crank angle after piston top dead center, the interval ($\alpha p$) between the end of preinjection and the beginning of main injection is between 3° and 14° crank angle, and the preinjection quantity is between 10% and 20% of the total preinjection and main injection quantity of idling load.

At engine rotational speed at maximum power and full load, preinjection is initiated within the range 20°–30° crank angle before piston top dead center position, main injection is initiated after 15° crank angle before top dead center, the interval ($\alpha p$) between the end of preinjection and the beginning of main injection is between 3° and 26° crank angle, and the preinjection quantity is between 1% and 5% of the total preinjection and main injection quantity.

In certain preferred embodiments, the preinjection at initial idling speeds is dispensed with and fuel is supplied only by the main injection. The idling speed preinjection described above is then initiated at engine speeds shortly above the initial idling speed.

In certain preferred embodiments, the preinjection and main injection timing vis-a-vis the piston crank angle is continuously adjusted as a function of engine speed within the above-noted limits for idling and rotational speed at maximum power and as a function of engine load within the above-noted limits for idling and full load.

Due to the fact that the preinjection quantity is very small and reaches the combustion space only relatively late, only extremely slight additional energy needs to be expended by the piston as a result of which an advantageous specific fuel consumption of the internal combustion engine is obtained. A further advantage of a relatively later injection of the very small preinjection quantity results from the fact that this fuel reaches the combustion space at a time at which a high compression pressure is already present. The preinjection quantity therefore ignites early and completely burns within a short time interval due to its small quantity so that the main injection can take place at only a slight interval after the end of the preinjection. In addition, it is advantageous that, on the one hand, a relatively high temperature level occurs in the combustion space before the main injection and, on the other hand, the gases located in the combustion space have an increased flow velocity. Thus, due to the relatively high temperature level, rapid evaporation of the injected fuel and, due to the increased flow velocity, good homogenization of the cylinder content is achieved after the beginning of the main injection. Rapid evaporation of the fuel and good formation of the mixture require a short ignition delay by means of which the rate of heat release is lowered at the beginning of the combustion of the main injection as a result of which less heat can also flow off into the cooling water. The burning out of the fuel is accelerated by reaction products from the preinjection so that the combustion process occurs at a relatively constant rate of heat release. Thus, the same advantages as in a prechamber engine are achieved with respect to noise and waste gas emissions; nevertheless, the consumption specific advantages of the direct injection method are retained.

In addition, the small ignition delay also leads to the pressure in the combustion space not being able to rise to values which are too high as a result of which peak temperature in the combustion space and thus the formation of nitrogen oxide is clearly lower compared with conventional direct injection methods. Finally, another advantage of the injection of as low a preinjection quantity as possible arises from the fact that a relatively large supply of fresh air is still available in the combustion space at the time of the beginning of the main injection so that no significant increase in the formation of particulate matter occurs.

An effect which is also advantageous for particulate emission is that, with the method according to the invention, complete conversion of the preinjection quantity is always ensured, starting from the lower speed range up into the range of rotational speed at maximum power before the beginning of the main injection. Referred to a strictly predetermined blackening number, an increased effective mean pressure and, at the same time, naturally also an increased internal combustion engine performance can thus be achieved.

A speed-dependent displacement of the beginning of preinjection and of the beginning of main injection in the manner according to the invention has the advantage that the conversion of the main injection quantity always occurs at the optimum time with respect to the efficiency of the internal combustion engine.

Since a diesel engine is always run with a large amount of excess air in the idling range and thus the emission of pollutants is relatively low, in any case, it is also possible to completely dispense with the preinjection in this operating range and to introduce the entire quantity of fuel into the combustion space with the main injection which begins approximately 2° after top dead center.

Another advantage of the direct injection method according to the invention arises from the fact that the compression ratio of the internal combustion engine can be reduced in the direction of a value which is optimum with respect to thermal and mechanical efficiency without having to fear an increased ignition delay and the associated disadvantages.

Other objects, advantages and novel features of the present invention will become apparent from the following detailed description of the invention when considered in conjunction with the accompanying drawings.

DETAILED DESCRIPTION OF THE DRAWINGS

Figure 1:
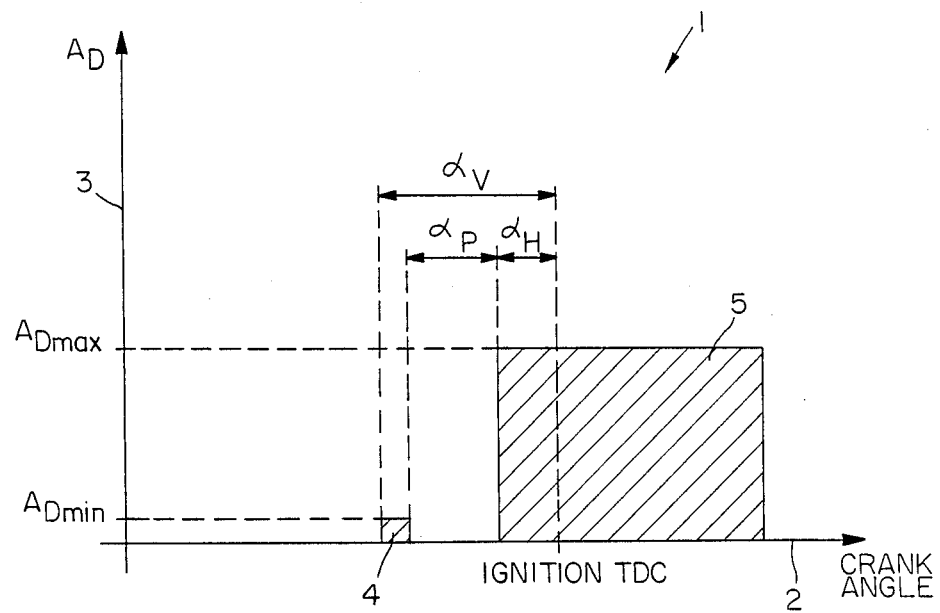
FIG. 1 is a graph schematically depicting the injection pump opening and timing of preinjection and main injection as a function of engine piston crank angle, in accordance with preferred embodiments of the present invention.

Referring to FIG. 1, the rotation of a crankshaft of a diesel engine is plotted in ° crank angle on the abscissa 2 and the aperture cross-section $A_D$ of a multi-hole nozzle, used for injection into the combustion space, of a monobloc injection pump and nozzle device controlled via an electronic control unit is plotted along the ordinate 3 of FIG. 1. See FIG. 2 and the description below of an injection pump and control system that can be used to practice the method of the present invention.

FIG. 1 depicts the time history of the fuel injection, the rectangle 4 representing the preinjection and the rectangle 5 representing the main injection. So that only as small as possible a quantity of fuel can reach the combustion space during the preinjection, only a minimum cross-section $A_{Dmin}$ is released at the injection nozzle in this period whereas, in contrast, the full opening cross-section $A_{Dmax}$ is released during the main injection. $\alpha_V$ designates the position of the beginning of the preinjection before ignition top dead center, $\alpha_P$ designates the interval between the end of the preinjection and the position $\alpha_H$ of the beginning of the main injection before ignition top dead center. $\alpha_V$, $\alpha_P$ and $\alpha_H$ are dependent on the speed of the internal combustion engine. Thus, $\alpha_V$ is approximately 10°–16° crank angle at idling speed and $\alpha_H$ is approximately −2° crank angle, that is to say the beginning of main injection occurs here approximately 2° after ignition top dead center. At rotational speed at maximum power, in contrast, $\alpha_V$ is approximately 20°–30° crank angle and $\alpha_H$ approximately 15° crank angle.

At speed ranges between idling and rotational speed at maximum power, the individual injection times are continuously adapted to the respective speed within the limits previously described, that is to say the beginning of the pre-injection shifts in the direction of ignition top dead center with dropping speed of the internal combustion engine, starting from approximately 20°–30° crank angle before ignition top dead center at rotational speed at maximum power to approximately 10°–16° crank angle before ignition top dead center at idling speed. The beginning of main injection is also continuously advanced with increasing speed, starting from approximately 2° crank angle after ignition top dead center at idling speed to approximately 15° crank angle before ignition top dead center at rotational speed at maximum power.

Depending on the instantaneous load of the internal combustion engine, the interval $\alpha_P$ between the end of preinjection and the beginning of main injection occurs within the range from 3°–14° crank angle at idling speed and within the range from 3°–26° crank angle at rotational speed at maximum power, the lower value (30°) applying in each case to the full load range and the higher value (14° or 26°, respectively) applying to the idling range.

Although $\alpha_P$ is partly relatively low in higher speed ranges, complete conversion of the entire preinjection is nevertheless always ensured. The reason for this is that the formation of mixture in the combustion space is improved with increasing speed, on the one hand due to the fact that the flow velocity of the fresh air taken in increases with increasing speed and, on the other hand due to the fact that the temperature level in the combustion space of the internal combustion engine increases with increasing speed. With a cylinder working volume of 300 cm³ up to 5,000 cm³, the most advantageous value for the preinjection quantity referred to a fuel density of 0.84 g/cm³ are approximately 0.5 mg fuel/stroke up to approximately 15 mg fuel/stroke. Referred to the entire quantity of fuel injected per stroke, the preinjection quantity amounts to approximately between 10%–20% at idling load and 1%–5% at full load.

Figure 2:
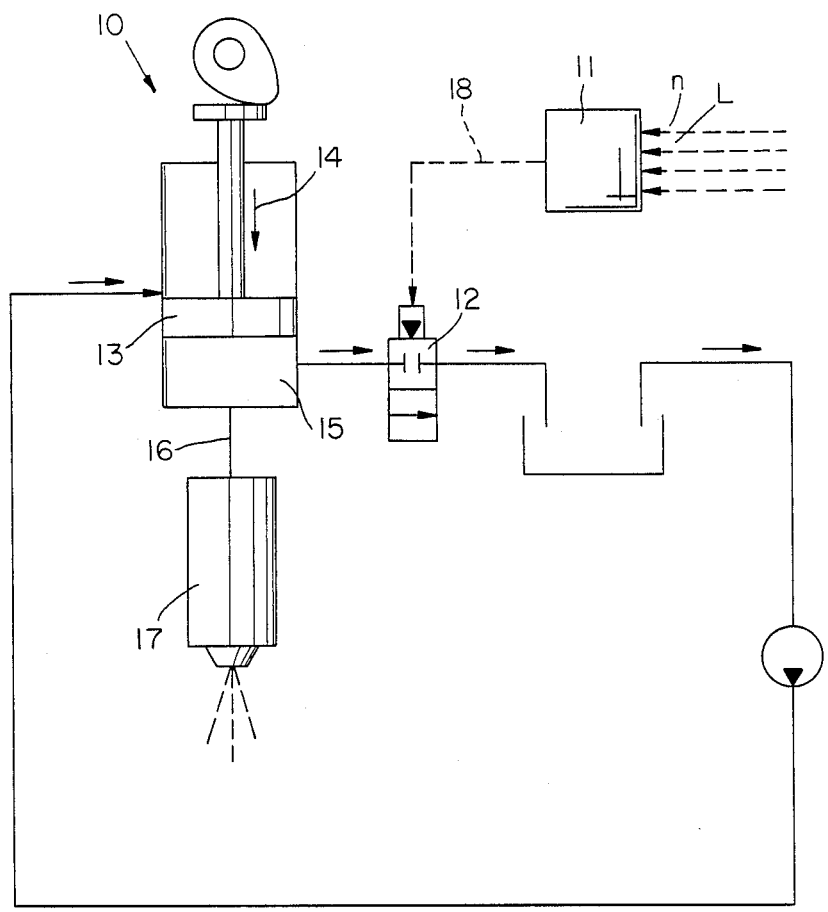
FIG. 2 is a schematic representation of a fuel pump and control arrangement for practicing the present invention.

FIG. 2 shows in a basic representation a known monoblock injection pump and nozzle device 10 which is electronically controlled via a control unit and by means of which the method according to the invention can be carried out. For this purpose, a regulating value (dashed arrow 18), which moves a solenoid valve 12 arranged at the monobloc injection pump and nozzle device 20 either into the closing or into the opening position (2/2-way valve), is generated by an electronic control unit 11 as a function of the load L and the speed n of the internal combustion engine. As long as the solenoid valve 12 is located in the opening position, no sufficiently high pressure can build up in the working space 15 and thus in the pressure line 16, which loads the needle valve, not shown in the drawing, of an injection nozzle 17 in the direction of the opening position, as result of a movement of the pump piston 13 occuring in the direction of the arrow 14 so that the needle valve is held in the closing position by a pretensioned spring, also not shown in the drawing, that is to say no fuel injection takes place.

However, in the case of a closed solenoid valve 12 (current switching position in the drawing), a pressure can be built up in the working space 15 and in the pressure line 16 which is sufficient for opening the needle valve against the force of the spring as a result of which an injection into the combustion space of the internal combustion engine can take place.

Thus, the quantity of fuel injected into the combustion space of the internal combustion engine depends on the closing period of the solenoid valve 12, this time interval being so short in the case of the prinjection according to the invention that the needle valve of the injection nozzle 17 is lifted off only to a minimum extent ($A_{Dmin}$) whereas during the main injection, a maximum needle valve stroke, that is to say a maximum cross-sectional area $A_{Dmax}$, is achieved due to the longer closure time of the solenoid valve 12.

Closer details about the operation of such a monobloc injection pump and nozzle device are given, for example, in European Patent EP-PS 0,178,428.

An exemplary practical embodiment of the present invention is described below in conjunction with Tables 1, 2 and 3. These tables relate to a test engine with cylinder/piston displacement volume of 550 ($cm^3$ cubic centimeters). Table 1 depicts the engine operating conditions at part-load (piston pressure approximately 1 atmosphere) as a function of engine rotational speed and Table 2 represents the engine operating conditions at full load (piston pressure approximately 7 atmospheres) as a function of engine rotational speed.

TABLE 1

| PARTLOAD OPERATION | | | | |
| --- | --- | --- | --- | --- |
| Engine Rotational Speed - (Rev./Min.) | 1000 | 2000 | 3000 | 4000 |
| Pre-Injection Quantity ($mm^3$/Stroke) | 1.0 | 1.2 | 1.2 | 1.4 |
| Total Injection Quantity ($mm^3$/Stroke) | 9.7 | 10 | 10.5 | 12 |
| Ratio of Pre-Injection To Total Injection Quantity (%) | 10.3 | 12 | 11.4 | 11.7 |
| $\alpha V$ (° before TDC) | 16 | 18 | 23 | 30 |
| $\alpha P$ (°) | 12 | 12 | 15 | 15 |
| $\alpha H$ (° before TDC) | 2 | 4 | 6 | 14 |

TABLE 2

| FULL LOAD OPERATION | | | | |
| --- | --- | --- | --- | --- |
| Engine Rotational Speed - (Rev./Min.) | 1000 | 2000 | 3000 | 4000 |
| Pre-Injection Quantity ($mm^3$/Stroke) | 1.0 | 1.2 | 1.2 | 1.4 |
| Total Injection Quantity ($mm^3$/Stroke) | 29 | 31.6 | 30.7 | 29 |
| Ratio of Pre-Injection To Total Injection Quantity (%) | 3.4 | 3.8 | 3.9 | 4.8 |
| $\alpha V$ (° before TDC) | 16 | 18 | 22 | 28 |
| $\alpha P$ (°) | 12 | 12 | 15 | 15 |
| $\alpha H$ (° before TDC) | 2 | 4 | 5 | 12 |

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Direct fuel injection method for a diesel engine, in which a preset quantity of fuel is introduced into a combustion space by a fuel injection nozzle in two separate injection quantities as pre and main injection quantity during the compression phase at different intervals from top dead center, the preinjection taking place within the last sixth of the compression phase with a preinjection quantity which is small in relation to the main injection quantity and the injection of the main injection beginning thereafter at a short interval after the preinjection end, wherein the beginning of the preinjection at idling speed is within the range of 10°–16° crank angle and at a rotational speed at maximum power within the range of 20°–30° crank angle, before top dead center, wherein the beginning of the main injection at idling speed is 2° crank angle after top dead center and at a rotational speed at maximum power within the range 15° crank angle, before top dead center, wherein the interval $\alpha_p$ between the end of preinjection and beginning of main injection at idling speed is within the range of 10° to 16° crank angle and at a rotational speed at maximum power within the range of 2° to 13° crank angle and wherein the preinjection quantity at idling is about 10°–20° and at full load about 1%–5% of the quantity of fuel preset in each case.

2. Direct fuel injection method according to claim 1, wherein the beginning of the pre and the main injection is continuously adapted to the respective current speed within the predetermined limits at speeds lying between the idling and the rotational speed at maximum power.

3. Direct fuel injection method according to claim 1, wherein the preinjection quantity is continuously adapted to the respective current load point within the predetermined limits within load ranges between idling and full load.

4. Direct fuel injection method according to claim 2, wherein the preinjection quantity is continuously adapted to the respective current load point within the predetermined limits within load ranges between idling and full load.

5. Direct fuel injection method for a diesel engine, in which a preset quantity of fuel is introduced into a combustion space by a fuel injection nozzle in two separate injection quantities as pre and main injection quantity during the compression phase at different intervals from top dead center, the preinjection taking place within the last sixth of the compression phase with a preinjection quantity which is small in relation to the main injection quantity and the injection of the main injection quantity beginning thereafter at a short interval after the preinjection end, wherein at initial low idling speed the fuel injection exclusively takes place via a main injection beginning with the range from 2° crank angle after top dead center, wherein shortly above the idling speed the fuel quantity is introduced into the combustion space is a pre and a main injection, the beginning of the preinjection in this speed range occurring within the range of 10°–16° crank angle and at a rotational speed at maximum power within the range of 20°–30° crank angle before top dead center, wherein the beginning of the main injection occurs within the range after 15° crank angle before top dead center at a rotational speed at maximum power, wherein the interval ($\alpha p$) between the end of preinjection and beginning of main injection occurs within the range of 10°–16° crank angle shortly above the idling speed and within the range of 2° to 13° crank angle at a rotational speed at maximum power, and wherein the preinjection quantity shortly above idling is about 10%–20% and at full load is about 1%–5% of the fuel quantity preset in each case.

6. Direct fuel injection method according to claim 5, wherein the beginning of the pre and the main injection is continuously adapted to the respective current speed within the predetermined limits at speeds lying between the idling and the rotational speed at maximum power.

7. Direct fuel injection method according to claim 5, wherein the preinjection quantity is continuously adapted to the respective current load point within the predetermined limits within load ranges between idling and full load.

8. Direct fuel injection method according to claim 6, wherein the preinjection quantity is continuously adapted to the respective current load point within the predetermined limits within the load ranges between idling and full load.

* * * * *